United States Patent
Miyake

(10) Patent No.: US 6,233,815 B1
(45) Date of Patent: May 22, 2001

(54) METHOD AND APPARATUS FOR MOLDING AND ASSEMBLING A RESIN PRODUCT

(75) Inventor: Kazuhiko Miyake, Ena (JP)

(73) Assignee: Kabushiki Kaisha Central Fine Tool

( * ) Notice: Subject to any disclaimer, the term of this patent is extended or adjusted under 35 U.S.C. 154(b) by 0 days.

(21) Appl. No.: 09/311,356

(22) Filed: May 13, 1999

(51) Int. Cl.$^7$ .............................. B21D 39/03; B23P 21/00; A23P 1/00
(52) U.S. Cl. .............................. 29/785; 29/783; 425/577
(58) Field of Search .................................... 29/430, 893.2, 29/783, 785, 791, 792, 822, 527.1; 264/238; 425/577, 588, 574, 317, 190

(56) References Cited

U.S. PATENT DOCUMENTS

| | | | |
|---|---|---|---|
| 5,037,597 | * 8/1991 | McGinley et al. | 264/238 |
| 5,689,876 | * 11/1997 | Suzuki et al. | 29/792 |
| 5,743,761 | * 4/1998 | Kawase | 439/595 |
| 5,814,356 | * 9/1998 | Ito et al. | 425/588 |

* cited by examiner

Primary Examiner—S. Thomas Hughes
Assistant Examiner—Marc Jimenez
(74) Attorney, Agent, or Firm—Shinjyu Global IP Counselors, LLP

(57) ABSTRACT

The present invention provides a method and apparatus for molding and assembling resin parts to produce a resin product, particularly, a resin product that includes relatively moveable functional parts, such as gears, in a manner that enables one by one parts molding and assembling and also enables reduction of manufacturing cost of the resin product. The apparatus of the present invention includes more than one pair of first and second engageable molding elements for molding resin parts, wherein a space for filling resin material is defined between the first and second molding elements while the first and second molding elements are engaged with each other, an assembling station having assembling sections for assembling the parts, and a transferring device which transfers the parts from the first or second molding elements to the corresponding assembling sections of the assembling station, wherein the first and second molding elements, the assembling station and the transferring device are all contained in a molding unit.

20 Claims, 18 Drawing Sheets

METHOD AND APPARATUS FOR MOLDING AND ASSEMBLING A RESIN PRODUCT

BACKGROUND OF THE INVENTION

1. Field of the Invention

The present invention relates to a method and apparatus for molding and assembling resin parts to produce a final resin product.

2. Description of the Prior Art

In a prior art manufacturing process, a resin product that includes resin parts, particularly, a resin product that includes relatively moveable functional resin parts, such as gears, is manufactured by molding the parts, transferring them to an assembling line, and then assembling them into a final product with aid of workers or robots.

However, in the prior art manufacturing process, construction of the assembling line and assignment of workers or robots along the assembling line for assembling the parts are required, resulting in relatively high manufacturing cost. Furthermore, due to a recent demand of producing various products in small quantities and increased complication of the products, the number of different parts manufactured at each manufacture is increased, leading to disadvantageous complication and difficulties in parts control.

SUMMARY OF THE INVENTION

Therefore, it is an objective of the present invention to provide a method and apparatus for molding and assembling resin parts to produce a resin product, particularly, a resin product that includes relatively moveable functional parts, such as gears, in a manner that enables one by one parts molding and assembling and also enables reduction of manufacturing cost of the resin product.

The present invention achieves the above objective by providing an apparatus for molding and assembling resin parts. The apparatus includes more than one pair of first and second engageable molding elements for molding resin parts, wherein a space for filling resin material is defined between the first and second molding elements while the first and second molding elements are engaged with each other, an assembling station having assembling sections for assembling the parts, and a transferring device which transfers the parts from the first or second molding elements to the corresponding assembling sections of the assembling station, wherein the first and second molding elements, the assembling station and the transferring device are all contained in a molding unit.

The present invention also achieves the above objective by providing a method for molding and assembling resin parts with use of an apparatus including more than one pair of first and second engageable molding elements for molding resin parts, wherein a space for filling resin material is defined between the first and second molding elements while the first and second molding elements are engaged with each other, an assembling station having assembling sections for assembling the parts, and a transferring device which transfers the parts from the first or second molding elements to the corresponding assembling sections of the assembling station, wherein the first and second molding elements, the assembling station and the transferring device are all contained in a molding unit, wherein the method includes steps of (1) engaging the first and second molding elements with each other and filling resin material into the space defined between the first and second molding elements to mold the parts, (2) disengaging the first and second molding elements from each other, (3) transferring the parts from the first or second molding elements to the corresponding assembling sections of said assembling station by the transferring means, and (4) rotating the rotatable member of the assembling station to bring the respective assembling section to a next rotational position for assembling next resin parts, wherein all of the steps (1) to (4) are repeated sequentially until all required resin parts are molded and assembled.

Other aspects and advantages of the present invention will become apparent from the following description, taken in conjunction with the accompanying drawings, illustrating by way of example the principles of the invention.

BRIEF DESCRIPTION OF THE DRAWINGS

The features of the present invention that are believed to be novel are set forth with particularity in the appended claims. The invention, together with objectives and advantages thereof, may best be understood by reference to the following description of the presently preferred embodiments together with the accompanying drawings in which:

DETAILED DESCRIPTION OF THE PREFERRED EMBODIMENTS

An apparatus for molding and assembling resin parts according to one embodiment of the present invention will now be described with reference to FIGS. 1 to 9.

Figure 19:
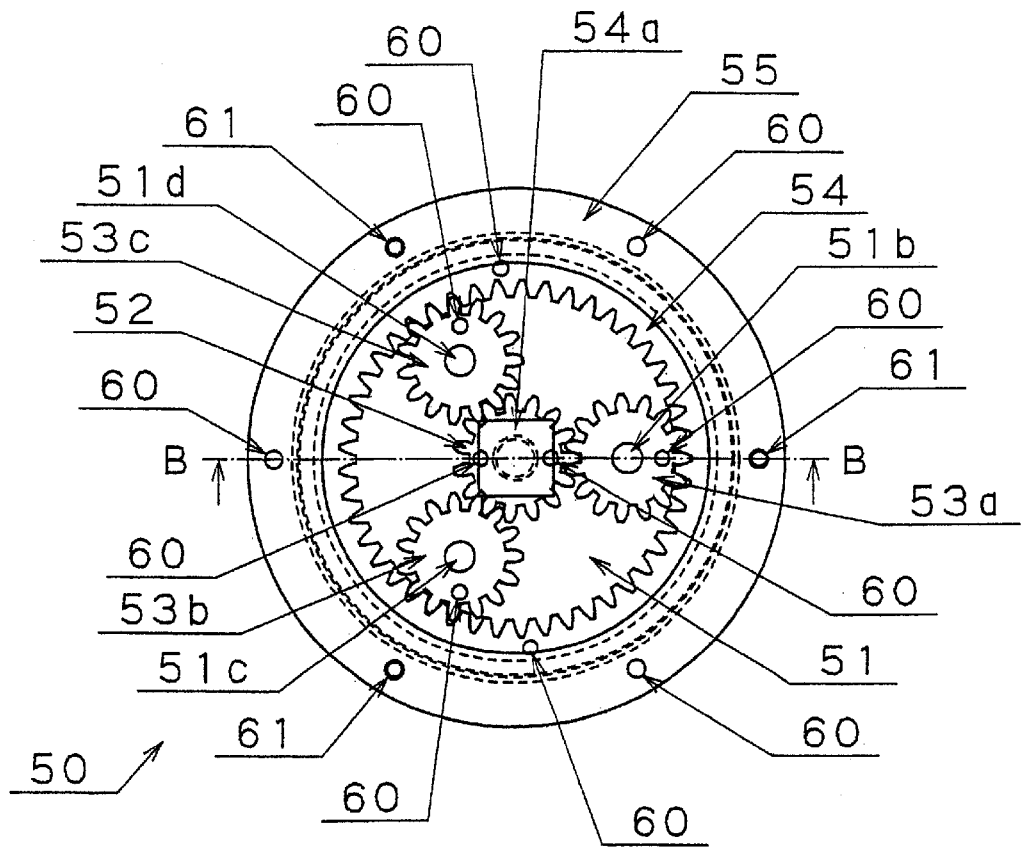
FIG. 19 is a plan view of a resin product that is produced by the apparatus shown in FIG. 1.
Figure 20:
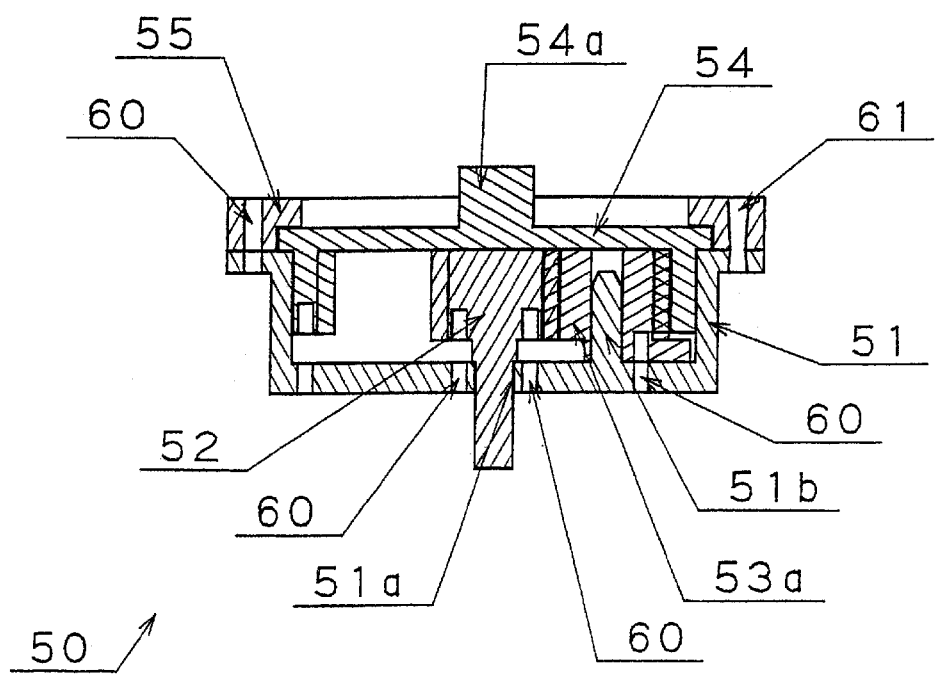
FIG. 20 is a cross-sectional view taken along line B—B in FIG. 19.
Figure 21:
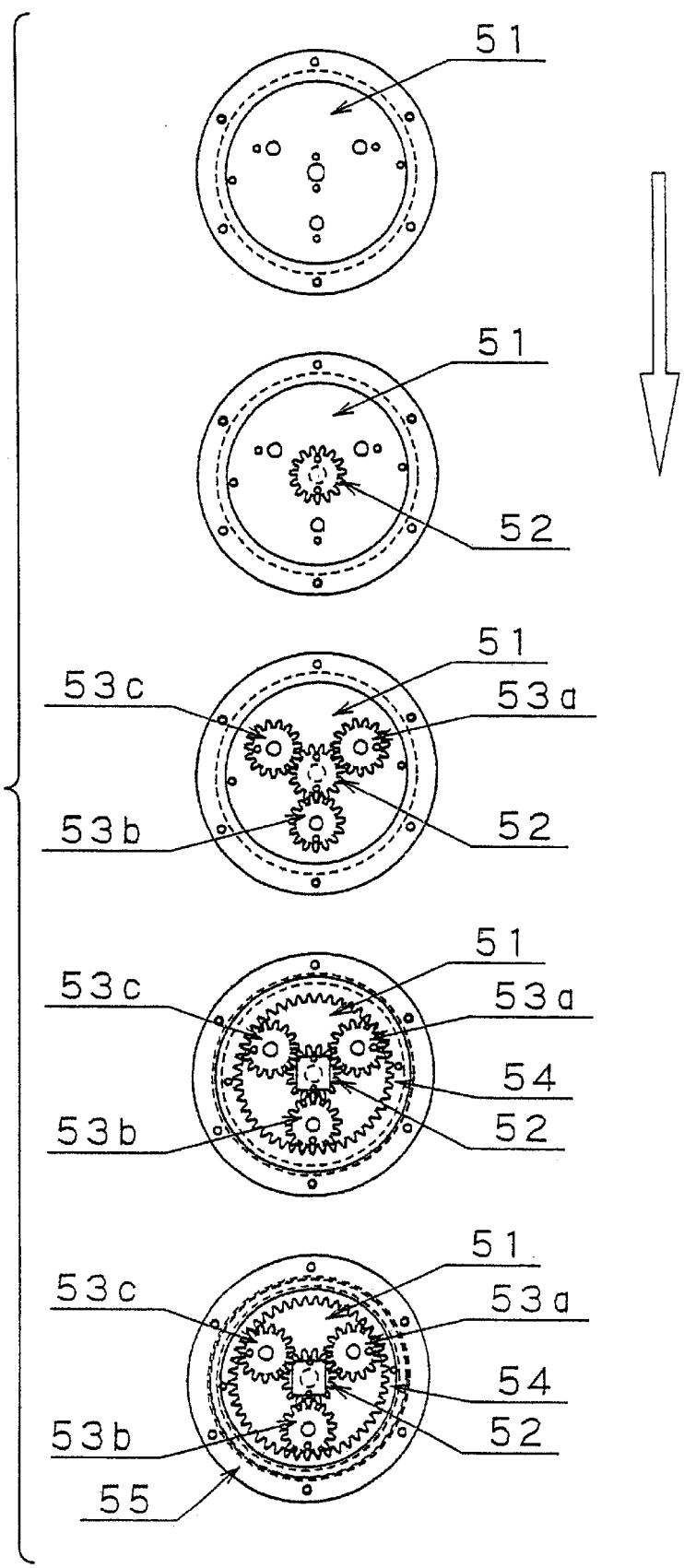
FIG. 21 is a descriptive view showing assembling procedure of the resin product shown in FIG. 19.

The apparatus 1 of the embodiment is designed for molding and assembling a gear box 50 shown in FIGS. 19 to 21.

As shown in FIGS. 19 and 20, the gear box 50 includes a housing 51, a first gear 52 that is rotatable about its shaft extending through a hole 51a arranged at the bottom center of a central recess of the housing 51, three second gears 53a–53c that are rotatable about corresponding shafts 51b–51d integrally formed with the housing 51 and are engaged with the first gear 52 at three peripheral points of the first gear 52 to rotate integrally with the first gear 52, a third gear (internal gear) 54 that engages with the second gears 53a–53c to rotate integrally with the second gears 53a–53c, and a cover 55 having a central through hole.

A projection 54a is integrally formed with the top surface of the third gear 54 and protrudes outwardly from the top surface of the third gear 54 through the central through hole of the cover 55. By rotating the projection 54a, the first, second and third gears 52–54 are integrally rotated.

As shown in FIG. 19, each part 51–55 of the gear box 50 has one or more holes 60 to receive holding pin(s) 10 of a rotatable member 3 of an assembling station, the details of which will be described later. Furthermore, three holes 61 extend through the housing 51 and the cover 55 at their peripherals. The holes 61 provide connections between the housing 51 and the cover 55 when molten resin is injected into the holes 61 and solidified therein.

As shown in FIG. 21, the gear box 50 is assembled by providing the first gear 52 to the central recess of the housing 51, arranging the second gears 53a–53c around the first gear 52, inserting the third gear (internal gear) 54 along the inner side wall of the central recess of the housing 51, and finally attaching the cover 55 to the housing 51.

The apparatus 1 is designed to assemble the gear box (resin product) 50 in the described sequence (indicated with an arrow in FIG. 21).

Figure 1:
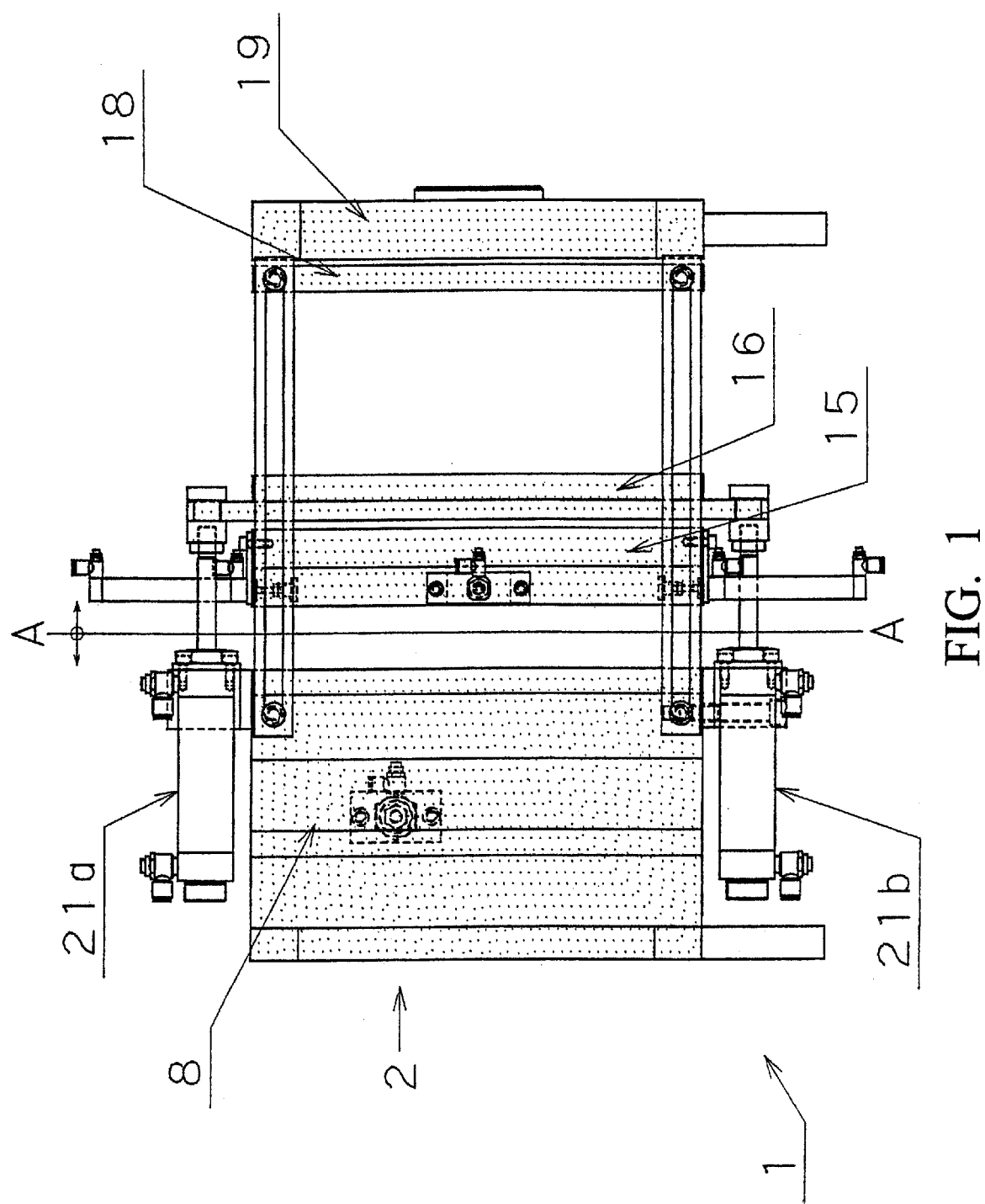
FIG. 1 is a top view of an apparatus for molding and assembling resin parts according to an embodiment of the present invention.

As shown in FIG. 1, the apparatus 1 for molding and assembling the gear box 50 is designed as an injection molding apparatus and has a mold 2 acting as the molding unit. The mold 2 includes a first mold plate 8, a second mold plate 15 provided in opposed relation to the first mold plate 8, a third mold plate 16 provided adjacent to the second mold plate 15, a fourth mold plate 18 and a fifth mold plate 19. The resin product is substantially molded and assembled between opposing mold plate surfaces C, D of the first and second mold plates 8, 15.

The first to third mold plates 8, 15, 16 can be reciprocated along guide posts 22 (FIG. 2) in a horizontal direction by a pair of mold plate drive cylinders 21a, 21b that are arranged at each side of the apparatus 1.

The third mold plate 16 constitutes part of a displacing device 5, which displaces the molded parts to the rotatable member 3 (FIG. 2), the details of which will be described later.

The fourth mold plate 18 is provided to remove an unnecessary runner 70 (FIG. 12) from the mold 2 after molding. The fourth mold plate 18 can be positioned away from the fifth mold plate 19 to displace and drop the runner 70.

Figure 10:
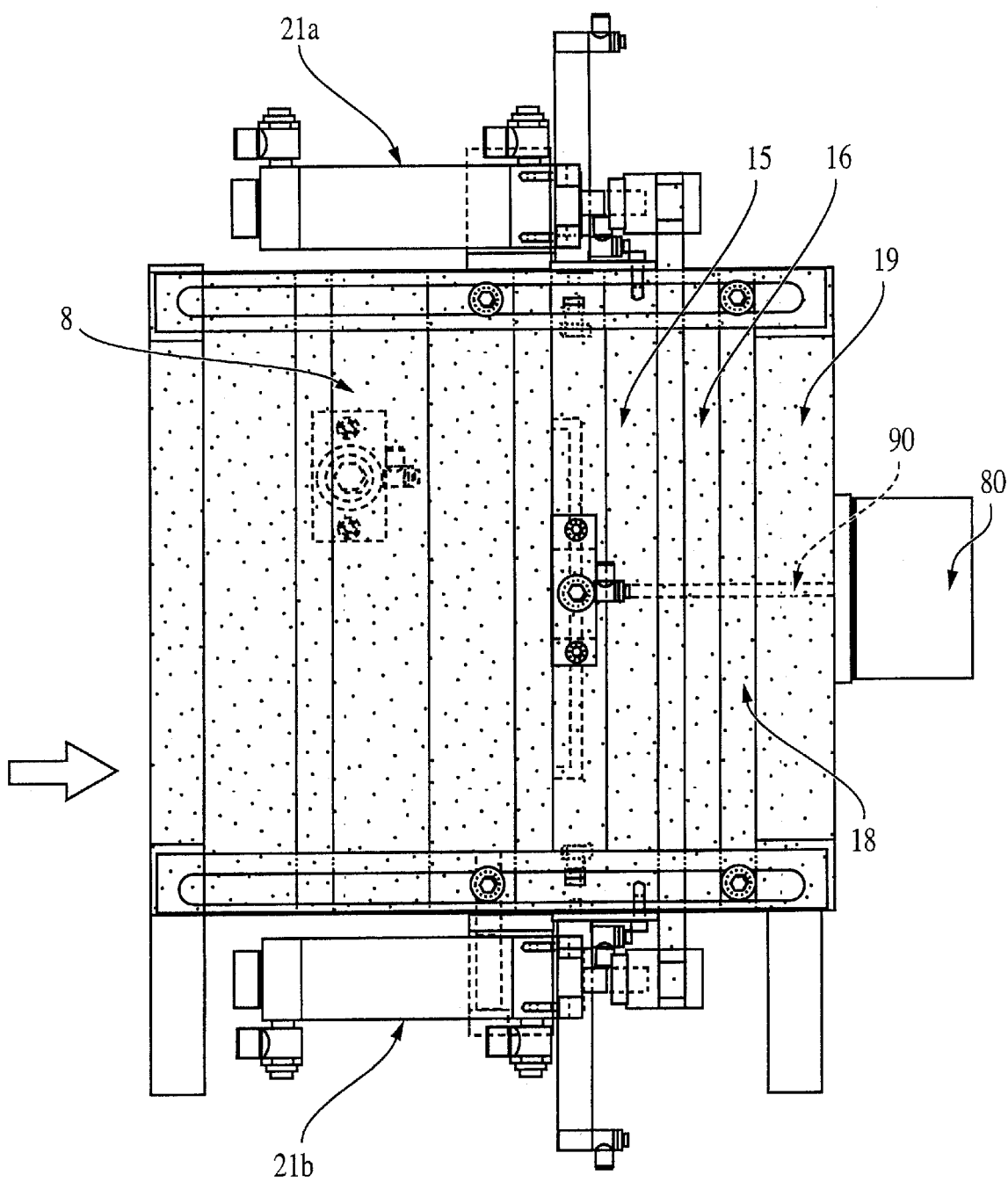
FIG. 10 is a descriptive view showing a first step of a method for molding and assembling resin parts according to one embodiment of the present invention.

As shown in FIG. 10, an injection unit 80 is arranged outside of the fifth mold plate 19. A sprue runner 90 extends from the injection unit 80 through the fifth, fourth, third and second mold plates 19, 18, 16, 15. The sprue runner 90 is branched to feed the molten resin into each cavity 12 and a resin product finish area 20 (FIG. 2) through respective gate.

Figure 2:
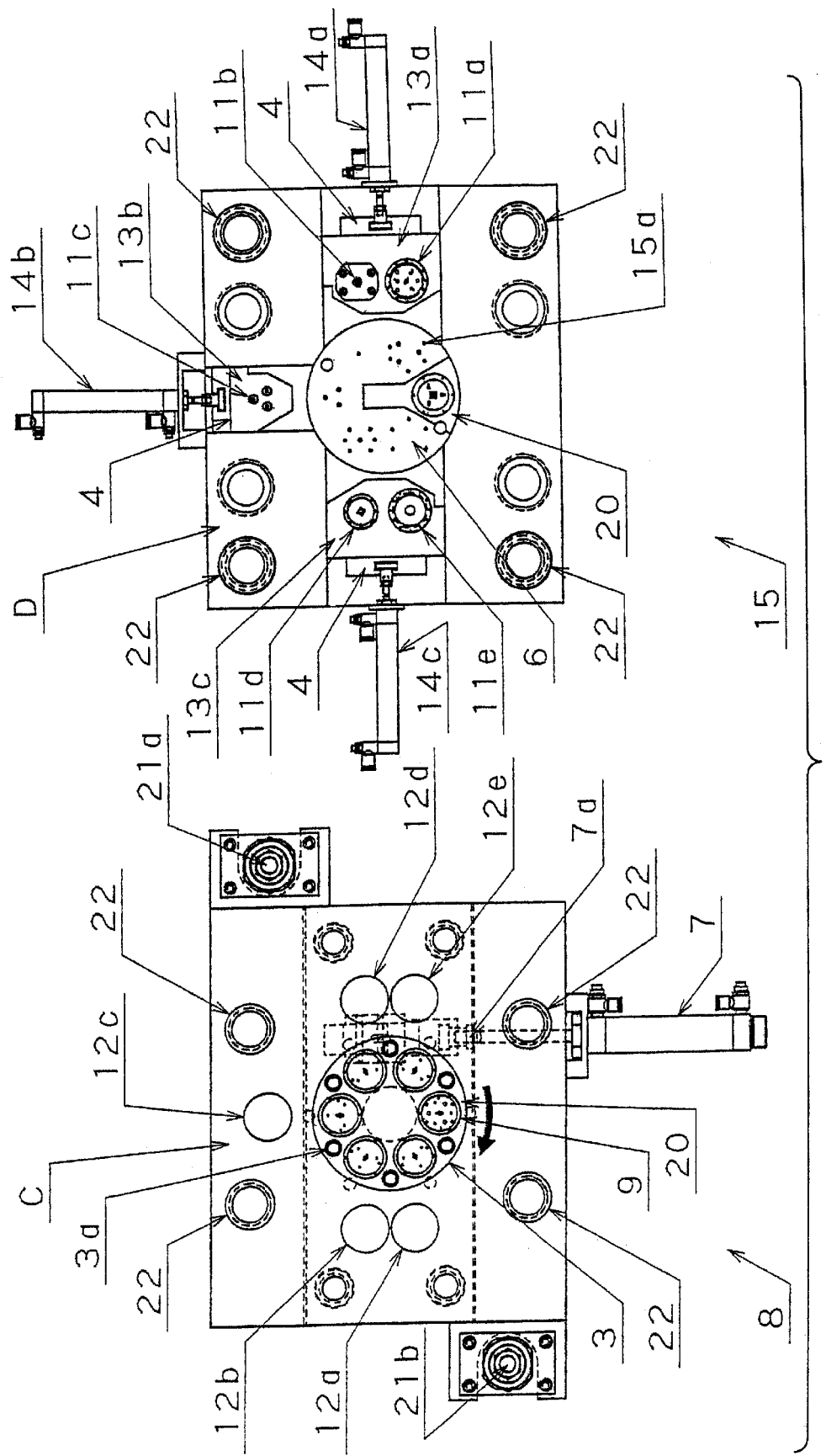
FIG. 2 is a view of opposing first and second mold plate surfaces C, D of the apparatus taken along line A—A in FIG. 1.

As shown in FIG. 2, the apparatus 1 of the present embodiment includes cavities 12 for molding the parts 51–55, the assembling station having the rotatable member 3, which rotates intermittently through a predetermined rotational angle per each molding, a transferring device 4 for transferring the parts 51–55, which are previously molded in the cavities 12, to the assembling station, and the displacing device 5 for displacing the transferred parts 51–55 to the rotatable member 3. Constructions of the characteristic part, i.e., the mold 2, of the apparatus 1 of the present invention will now be described in details.

As shown in FIG. 2, the cavities 12 are provided in the mold plate surface C of the first mold plate 8. More particularly, the cavities 12 include a first cavity 12a for molding the housing 51, a second cavity 12b arranged above the first cavity 12a for molding the first gear 52, a third cavity 12c arranged at the upper central area for molding the second gears 53a–53c, a fourth cavity 12d for molding the third gear 54, and a fifth cavity 12e arranged below the fourth cavity 12d for molding the cover 55.

As described above, the apparatus 1 of the present invention is characterized in that the cavities for molding the parts are arranged in one mold plate surface. Although the apparatus 1 according to the present embodiment has five cavities, the number of cavities are not limited to five and an be changed to any number based on the number of the parts 51–55.

The assembling station is provided for sequentially assembling the parts 51–55, which are molded in the cavities 12. In this embodiment, the assembling station includes the rotatable member (turn table) 3, which is arranged in the first mold plate surface C, and a circular plate 6, which is arranged in the second mold plate surface D in opposed relation to the rotatable member 3.

As described above, the apparatus 1 of the present invention is further characterized in that the cavities (molding elements) and the assembling station (assembling sections) are provided separately.

The rotatable member 3, which is arranged in the first mold plate surface C, is preferably rotated intermittently through predetermined rotational angles by a rotatable member drive cylinder 7, which has a rod 7a that reciprocates in a vertical direction. More specifically, as shown in FIG. 2, the rotatable member 3 of the present embodiment has six bars 3a, which are arranged at predetermined angular intervals. The bars 3a extend horizontally from the rear side of the rotatable member 3. When the rod 7a of the rotatable member drive cylinder 7 moves in one direction (toward a lower side of FIG. 2 in this embodiment), a claw (not shown) of the rod 7a is extended and engages with one of the bars 3a to rotate the rotatable member 3 clockwise as indicated with a solid arrow. The rotating mechanism of the rotatable member 3 is not limited to this particular mechanism, and any mechanism that can rotate intermittently through a predetermined rotational angle can be used for this invention.

The rod 7a of the rotatable member drive cylinder 7 is controlled to reciprocate once per each molding, so that the rotatable member 3 is rotated intermittently through a predetermined rotational angle per each molding.

More particularly, a predetermined rotational angle of the rotatable member 3 is determined by the following equation (1).

$$\text{a predetermined rotational angle} = 360°/\text{the number of assembling steps} \quad (1)$$

The number of assembling steps in the equation (1) is the number of steps required for assembling a resin product. In this embodiment, the number of assembling steps is six, including five assembling steps for sequentially fitting five parts 51–55, which are respectively molded in five cavities 12, and one connecting step for connecting the housing 51 and the cover 55 together. As a result, a predetermined rotational angle obtained from the equation 1 is 60 degrees, so the rotatable member 3 is controlled to rotate intermittently through 60 degrees per each molding.

The rotatable member of the present invention is not limited to the above described rotatable member 3 that rotates intermittently through predetermined rotational angles. The rotatable member of the present invention includes any type of rotatable member that rotates intermittently to allow sequential fitting of the parts, for example, a rotatable member that rotates intermittently through equal rotational angles. Furthermore, although the assembling station of the present embodiment includes the turn table as the rotatable member that rotates on the mold plate surface, the assembling station of the present invention can include an assembling station that has an assembling line with a belt conveyor extending from one end to other end of the mold plate surface. Preferably, such assembling station moves intermittently through predetermined distances. Each predetermined distance is obtained from the following equation (2).

$$\text{a predetermined distance} = \frac{\text{entire length of the assembling line}}{\text{the number of assembling steps}} \quad (2)$$

Furthermore, in this embodiment, although the rotatable member 3, which constitutes part of the assembling station, is located inward of the cavities 12a–12e, i.e., substantially at the center of the first mold plate surface C, the rotatable member 3 can be replaced with another type of rotatable member, which is located outward of the cavities 12a–12e, such as an annular assembling station that extends in a plane of the mold plate surface C.

In the present embodiment, the rotatable member 3 is located substantially center of the first mold plate 8, and the cavities 12a–12e are arranged outside of the rotatable member 3 in assembling order of the parts 51–55, i.e., cavities 12a, 12b, 12c, 12d and 12e in a rotational direction of the rotatable member 3.

Figure 3:
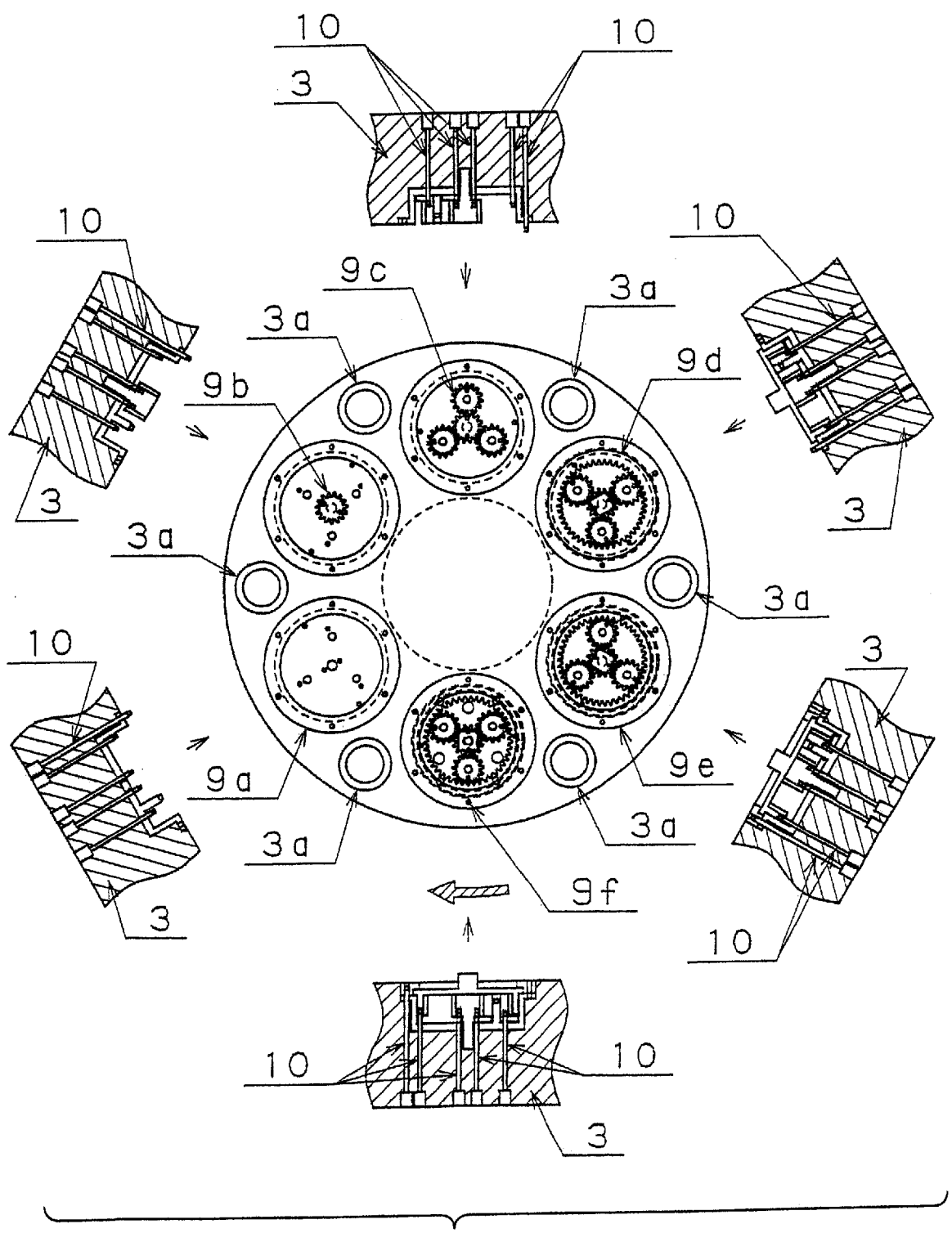
FIG. 3 is a descriptive view showing a rotatable member of the apparatus shown in FIG. 1.

The rotatable member 3 has assembling sections 9 on its surface, the number of which is equal to the number of assembling steps. More specifically, the rotatable member 3 of the present embodiment has six assembling sections 9a–9f as shown in FIG. 3.

These assembling sections 9a–9f are also arranged at predetermined angular intervals, each of which is determined by the following equation (3), to correspond with a predetermined rotational angle of the rotatable member 3.

$$\text{predetermined angular interval} = \frac{360°}{\text{the number of assembling steps}} \quad (3)$$

In this embodiment, the number of assembling steps is six as described above, so the assembling sections 9a–9f are spaced 60 degrees from each other according to the equation (3).

In the rotatable member 3 of the assembling station, more particularly, assembling sections 9a–9f, holding pins 10 for holding the parts 51–55 extend horizontally as shown in FIG. 3. Each holding pin 10 holds the corresponding part 51–55 to prevent disengagement of the part 51–55 from the corresponding assembling section 9a–9f of the rotatable member 3 or prevent rotation of the part 51–55 after the part 51–55 is transferred to the assembling section 9a–9f by the displacing device 5. If the resin product includes relatively moveable functional parts, such as gears, the parts can be non-rotatably held while assembling them.

More specifically, each part 51–55 is held by at least one holding pin 10 in the rotatable member 3. In a case of relatively rotatable functional parts, such as gears, each part is held by at least two holding pins 10 to prevent relative movement, such as rotation.

In this embodiment, as shown in FIG. 3, ten holding pins 10 are provided in each assembling section 9a–9f (total of sixty holding pins 10). Location of each holding pin 10 is not changed from one assembling section to another assembling section. Therefore, when the rotatable member 3 rotates intermittently, relative position of each pin 10 with respect to the corresponding part 51–55 is not changed. The housing 51 is non-moveably held by three holding pins 10. The first gear 52 is non-rotatably held by two holding pins 10. Each of three second gears 53 is non-rotatably held by one holding pin 10. The third gear 54 is non-rotatably held by two holding pins 10. The cover 55 is non-moveably held by the same three holding pins 10 that hold the housing 51.

Holes or recesses 60 of the parts 51–55, to which the holding pins 10 are inserted, are produced during molding. By making a diameter of each hole or recess 60 smaller than that of the corresponding holding pin 10, the corresponding part 51–55 can be tightly held by the holding pin 10 after the part 51–55 is displaced to the rotatable member 3 by the displacing device 5, so the part 51–55 is not easily disengaged from the corresponding assembling section 9.

In this embodiment, although each holding pin 10 has a circular cross-section, the holding pin 10 can have any cross-sectional shape, such as a polygonal or ellipsoidal shape.

The transferring device 4 transfers the parts 51–55, which are molded in the corresponding cavities 12, to predetermined locations of the assembling station.

Figure 13:
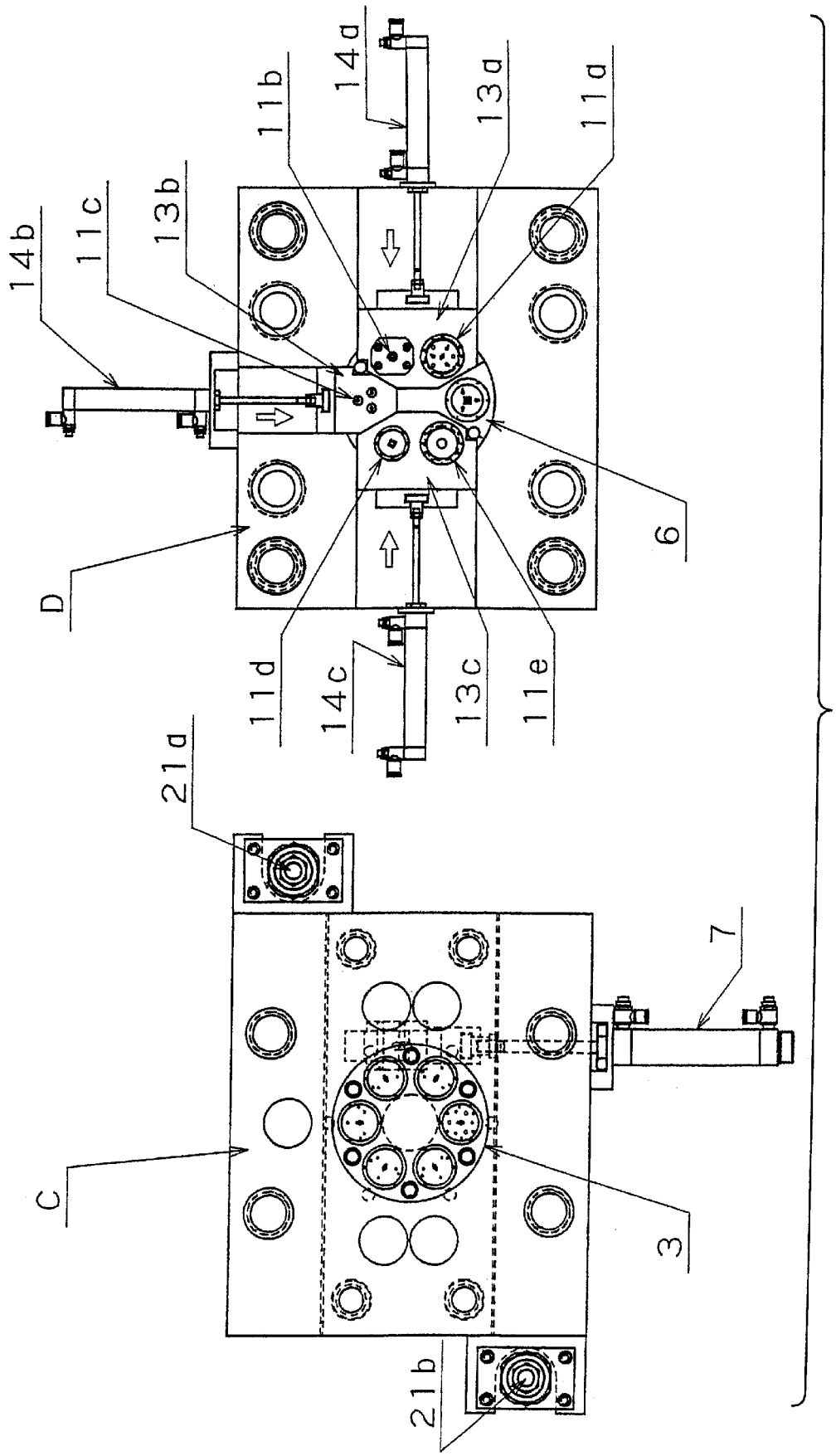
FIG. 13 is a descriptive view showing a third step of the method.

In this embodiment, as shown in FIG. 2, the transferring device 4 includes first to third sliders 13a–13c and first to third slider drive cylinders 14a–14c for reciprocating the corresponding sliders 13a–13c. As shown in FIG. 13, when each rod of the slider drive cylinder 14a–14c is fully extended, the corresponding slider 13a–13c is positioned over the circular plate 6 of the assembling station.

The first slider 13a has a first core 11a, which molds the housing 51 in cooperation with the first cavity 12a, and a second core 11b, which molds the first gear 52 in cooperation with the second cavity 12b. The second slider 13b has a third core 11c, which molds three second gears 53 in cooperation with the third cavity 12c. The third slider 13c has a fourth core 11d, which molds the third gear 54 in cooperation with the fourth cavity 12d, and a fifth core 11e, which molds the cover 55 in cooperation with the fifth cavity 12e.

When the rods of the first to third slider drive cylinders 14a–14c are fully retracted (initial positions shown in FIG. 2), the cavities 12 and cores 11 are opposed each other on the first and second mold plate surfaces C, D, respectively, so that molding can be initiated.

On the other hand, in the transferring process, as shown in FIG. 13, the rods of the first to third slider drive cylinders 14a–14c are fully extended, so the first to third sliders 13a–13c are placed at predetermined positions over the rotatable member 3 while the parts 51–55 are held in the corresponding cores 11 of the sliders 13a–13c. Therefore, the apparatus 1 of the present invention is further characterized in that the cores 11 are provided in the sliders 13a–13c and are moved along with the sliders 13a–13c and is also characterized in that the parts 51–55 are moved along with the cores 11.

The displacing device 5 displaces the parts 51–55, which are previously transferred by the transferring device 4, to the rotatable member 3. In this embodiment, as shown in FIG. 6, the displacing device 5 includes the third mold plate 16, push pins 17 that protrude from the third mold plate 16, holes 15a that extend through the second mold plate 15 for receiving the corresponding push pin 17, and knockout pins 23 that are slidably received in the corresponding sliders 13a–13c and are pushed by the corresponding push pins 17.

Figure 6:
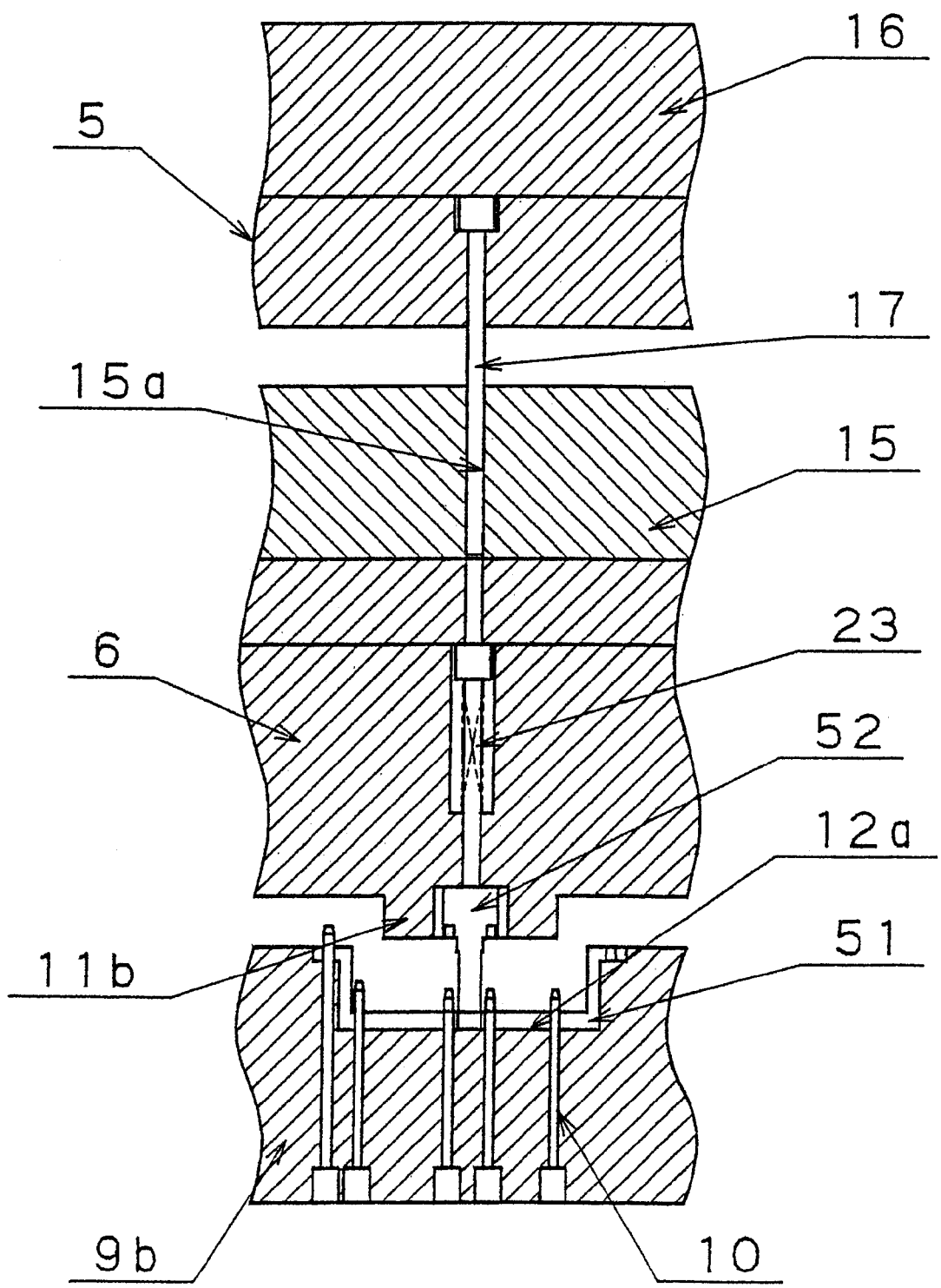
FIG. 6 is a descriptive view showing operation of a displacing device of the apparatus shown in FIG. 1.
Figure 7:
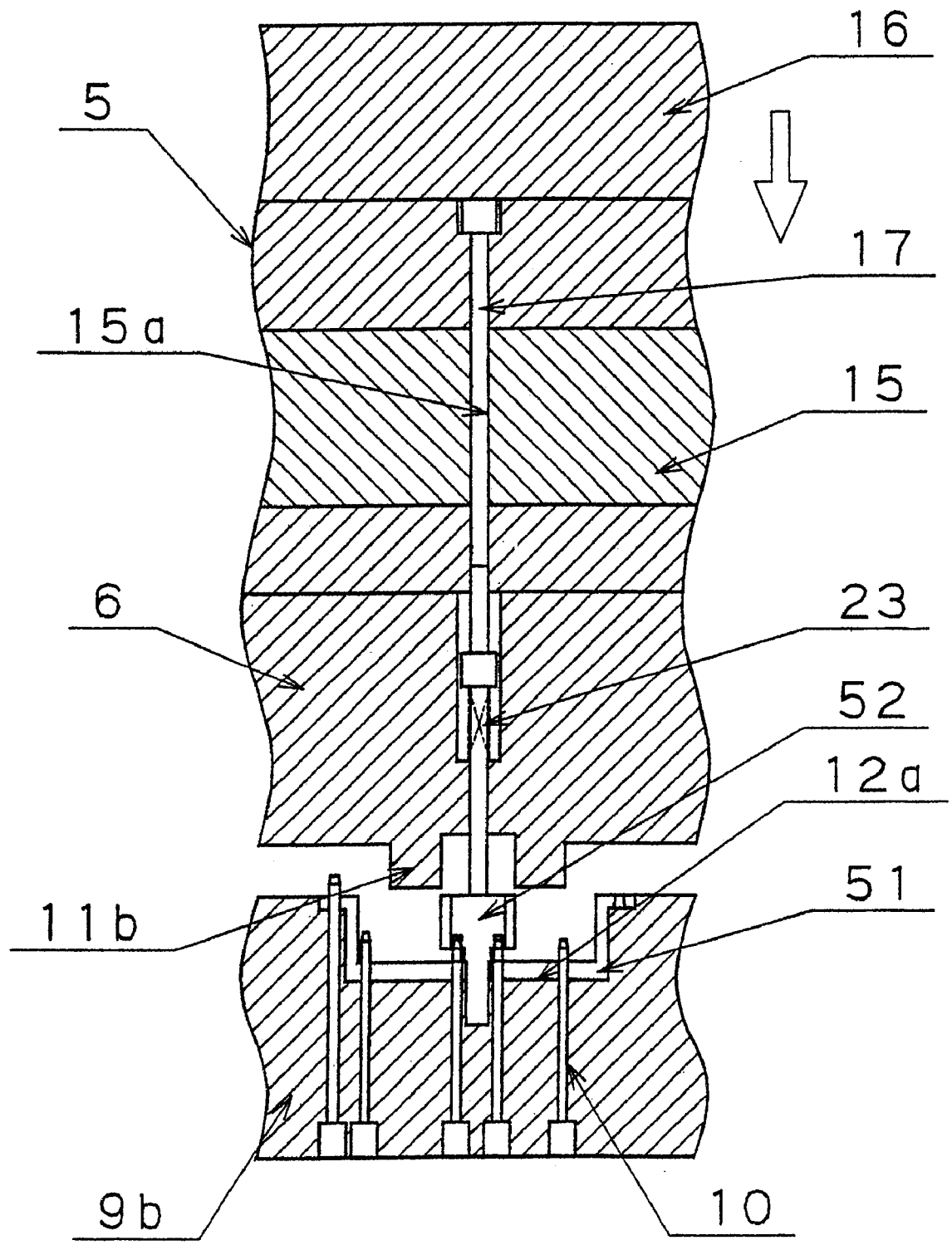
FIG. 7 is another descriptive view showing operation of the displacing device of the apparatus shown in FIG. 1.
Figure 8:
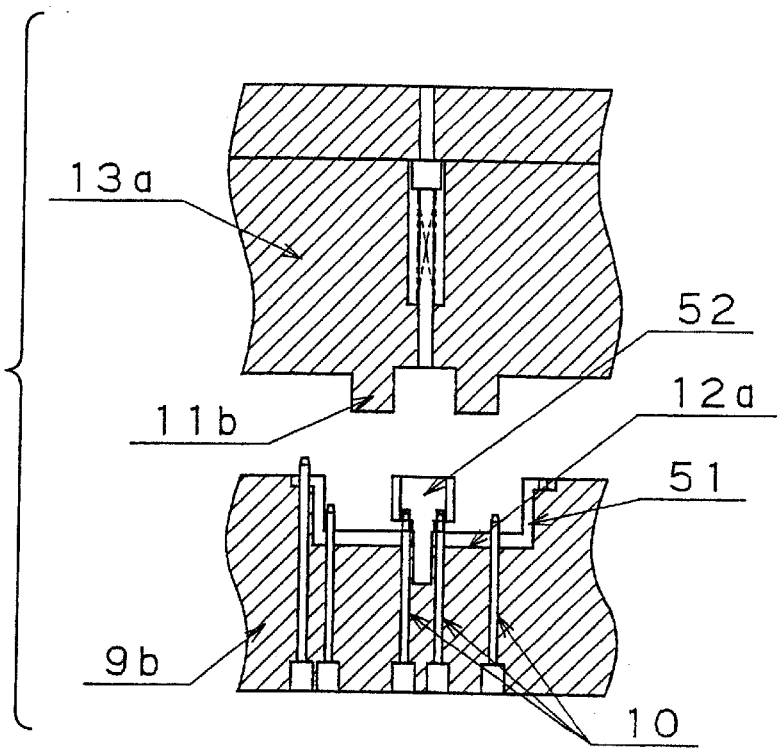
FIG. 8 is another descriptive view showing operation of the displacing device of the apparatus shown in FIG. 1.
Figure 9:
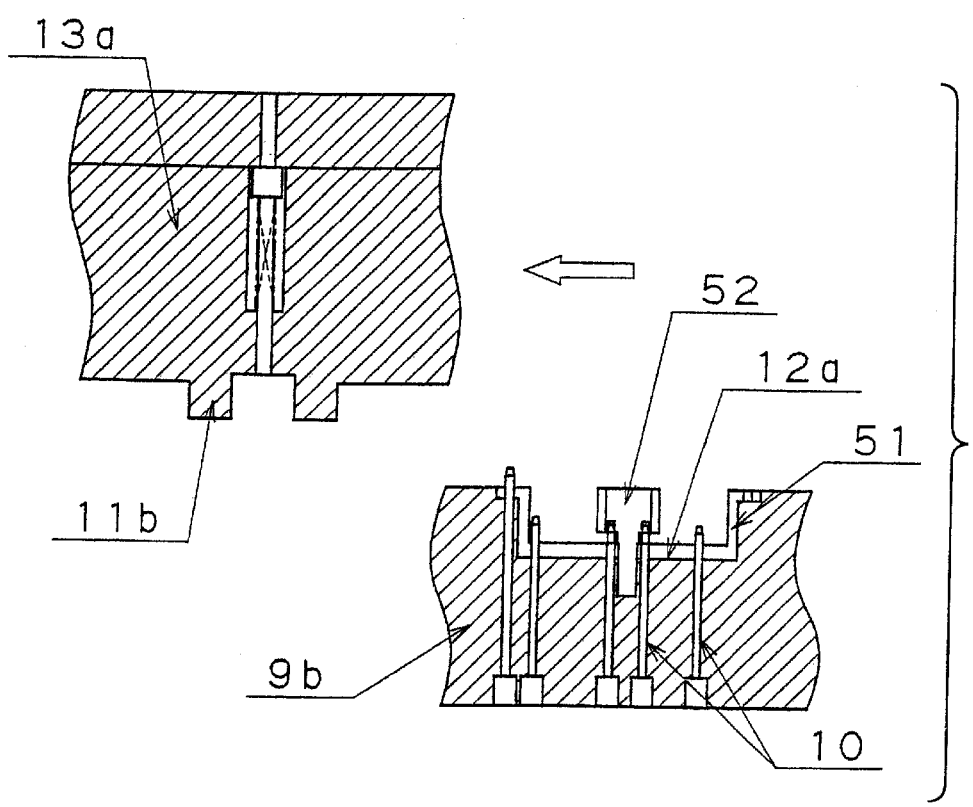
FIG. 9 is a descriptive view showing operation of the transferring device of the apparatus shown in FIG. 1.

More particularly, as shown in FIG. 6, each push pins 17 extends in a direction perpendicular to the third mold plate 16 (i.e., a horizontal direction) and can extend through the hole 15a of the second mold plate 15 and the circular plate 6. Each knockout pin 23 can move in the corresponding slider 13a–13c. As shown in FIG. 7, when the rear end of each knockout pin 23 is pushed by the corresponding push pin 17, the distal end of the knockout pin 23 protrudes slightly from the corresponding slider 13a–13c.

Therefore, when the third mold plate 16 is moved in a direction indicated by an arrow in FIG. 7 to engage the third mold plate 16 to the second mold plate 15, the push pins 17 are urged against the knockout pins 23, so the knockout pins 23 protrude slightly from the corresponding sliders 13a–13c. Each molded resin part 51–55 is designed to adhere to the corresponding core 11 due to post-mold shrinkage of the resin part 51–55. The resin parts 51–55 that adhere to the corresponding cores 11 can be displaced from the cores 11 to the corresponding assembling sections 9 of the rotatable member 3 by urging the knockout pins 23 against the resin parts 51–55 to knockout the resin parts 51–55.

One or more push pins 17 are appropriately provided for each resin part 51–55 to displace the resin part 51–55 to the rotatable member 3. Each knockout pin 23 is urged upwardly in FIG. 7 by a spring, so that when the push pin 17 is moved away from the knockout pin 23, the knockout pin 23 is automatically returned to its initial position shown in FIG. 6.

As shown in FIG. 2, the resin product finish area 20 is provided at the lower end of the assembling station. After each assembling section 9a–9f is moved to the resin product finish area 20, the resin product is assembled completely, or finished therein.

More particularly, in this embodiment, the housing 51 and the cover 55 are connected together at the resin product finish area 20. That is, at the resin product finish area 20, molten resin is filled into three holes 61, which extend through the housing 51 and the cover 55 at their peripherals, and is solidified therein to connect the housing 51 and the cover 55 together as described above. Thereafter, an ejector pin (not shown) protrudes from the rotatable member side to eject the resin product 50.

As described above, in the apparatus 1, the parts 51–55, which are previously molded in the cavities 12, are transferred to predetermined locations of the assembling station by the transferring device 4 and, then, are displaced to the rotatable member 3 by the displacing device 5. The rotatable member 3 rotates intermittently through a predetermined rotational angle or moves through a predetermined distance per each molding. Therefore, each time the rotatable member 3 rotates through a predetermined rotational angle or moves through a predetermined distance, each part 51–55 of one resin product is sequentially fitted in the same assembling section 9a–9f. After the assembling section 9a–9f reaches the resin product finish area 20, the resin product is finished therein. By repeating these steps, the resin products are continuously produced at the resin product finish area 20 at a rate of one resin product per molding (per shot in a case of injection molding).

If the resin product does not require a shield, the step of connecting the housing 51 and the cover 55 together can be eliminated, so the assembling of the resin product is completed when the final resin part (the cover 55 in this embodiment) is fitted. Furthermore, instead of using molten resin filled into the holes 61 for connecting the housing 51 and the cover 55, three connecting rods, which are designed to fit into three holes 61 for connecting the housing 51 and the cover 55, can be provided. The connecting rods are molded in a newly provided cavity 12 and are inserted into the corresponding holes 61 after being transferred to the assembling station. Also, beside the steps of fitting the resin parts 51–55 and connecting the resin parts 51–55, other step(s) can be provided. For example, step of treating the surface of the resin parts 51–55 can be provided. Furthermore, the apparatus 1 is designed to use one type of resin to produce the resin product, so that only one injection unit is provided in this embodiment. However, if two or more types of resin are used to produce the resin product, two or more injection units can be provided. Although the transferring device 4 of this embodiment transfers the resin parts 51–55 inwardly, the transferring device 4 can be changed to transfer the resin parts 51–55 outwardly by providing the assembling station outward of the cavities 12. Furthermore, in this embodiment, the rotatable member 3 of the assembling station and the transferring device 4 are provided in the first mold plate surface C and the second mold plate surface D, respectively. This arrangement can be reversed to provide the rotatable member 3 and the transferring device 4 in the second mold plate surface D and the first mold plate surface C, respectively. Alternatively, both the rotatable member 3 and the transferring device 4 can be provided in the first mold plate surface C or the second mold plate surface D. Also, in this embodiment, the cavities 12 and the cores 11 are provided in the first mold plate surface C and the second mold plate surface D, respectively. This arrangement can also be reversed to provide the cavities 12 and the cores 11 in the second mold plate surface D and the first mold plate surface C, respectively. Although the apparatus 1 of the present embodiment is designed for injection molding, the above described characteristic construction of the apparatus 1 can be applied to other kinds of resin molding apparatuses, and all of these apparatuses are included in the present invention.

A method for molding and assembling a resin product will now be described with reference to the apparatus 1 in connection with the accompanying drawings.

In the apparatus 1 of this embodiment, the resin product is molded and assembled by a method that includes steps of filling resin into cavities 12 to mold the parts 51–55, transferring the parts 51–55 to predetermined locations of the assembling station by the transferring device 4, displacing the parts 51–55 to the rotatable member 3 of the assembling station and fitting the parts 51–55 by the displacing device 5, and intermittently rotating the rotatable member 3 of the assembling station through predetermined rotational angles, all of which are repeated in this sequence to mold and assemble the resin product.

More particularly, in this embodiment, the resin product is molded and assembled by repeating a first step of engaging the first to fifth mold plates 8, 15, 16, 18, 19 together to eliminate space between the opposing mold plates and filling resin into cavities 12 to mold the parts 51–55, a second step of disengaging the first to fifth mold plates 8, 15, 16, 18, 19 from each other, a third step of transferring the parts 51–55 to predetermined locations of the assembling station by the transferring device 4, a fourth step of engaging the second mold plate 15 to the first mold plate 8, fifth step of engaging the third mold plate 16 to the second mold plate 15 to displace the parts 51–55 to the rotatable member 3 of the assembling station and assemble the parts 51–55 by the displacing device 5, a sixth step of disengaging the first to third mold plates 8, 15, 16 from each other, a seventh step of rotating a rotatable member 3 of the assembling station through a predetermined rotational angle, and an eighth step of placing the cavities 12 and cores 11 at moldable positions in mutually opposed relation by the transferring device 4. Each of these steps will now be described in details.

Figure 11:
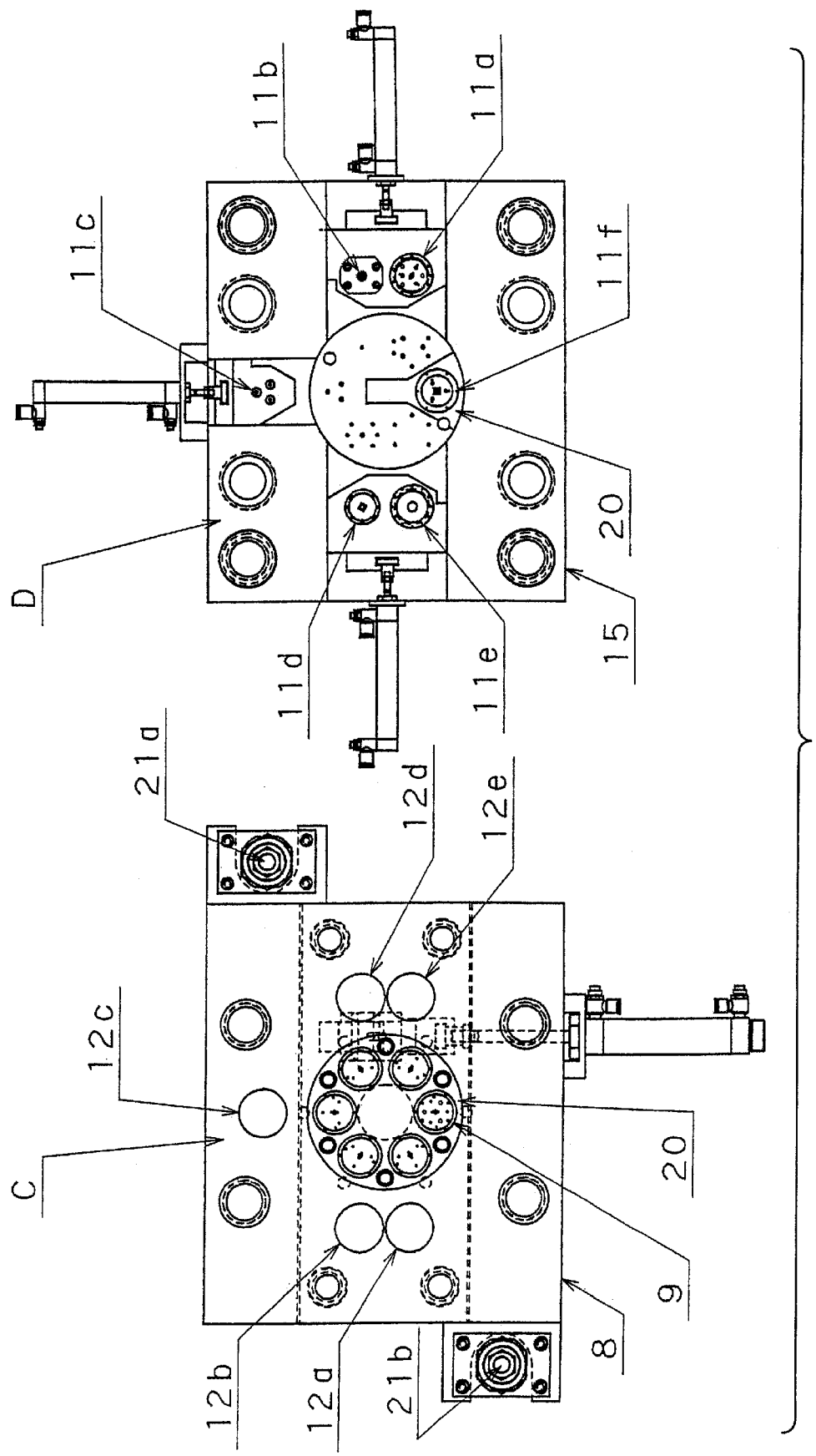
FIG. 11 is another descriptive view showing the first step of the method.

In the first step, as shown in FIG. 10, the mold plate drive cylinders 21a, 21b are operated to move the first to third mold plates 8, 15, 16 in a horizontal direction (a direction indicated with an arrow), so the first to fifth mold plates 8, 15, 16, 18, 19 are engaged together. Then, molten resin is injected from the injection unit 80 into the cavities 12 through the sprue runner 90 provided in the mold 2 to mold the parts 51–55 by injection molding. At this time, the first to fifth cores 11a, 11b, 11c, 11d, 11e in the second mold plate surface D are in the initial positions, as shown in FIG. 11, and mold the parts 51–55 in cooperation with the first to fifth cavities 12a, 12b, 12c, 12d, 12e, respectively.

The present method produces the resin products continuously at a rate of one resin product per each molding by repeating the first to eighth steps, which constitute one production cycle. Therefore, when the first step (molding step) is completed, the housing 51 and the cover 55 are already connected together at the resin product finish area 20, so the final resin product (the gear box 50) is already produced at the resin product finish area 20.

Figure 12:
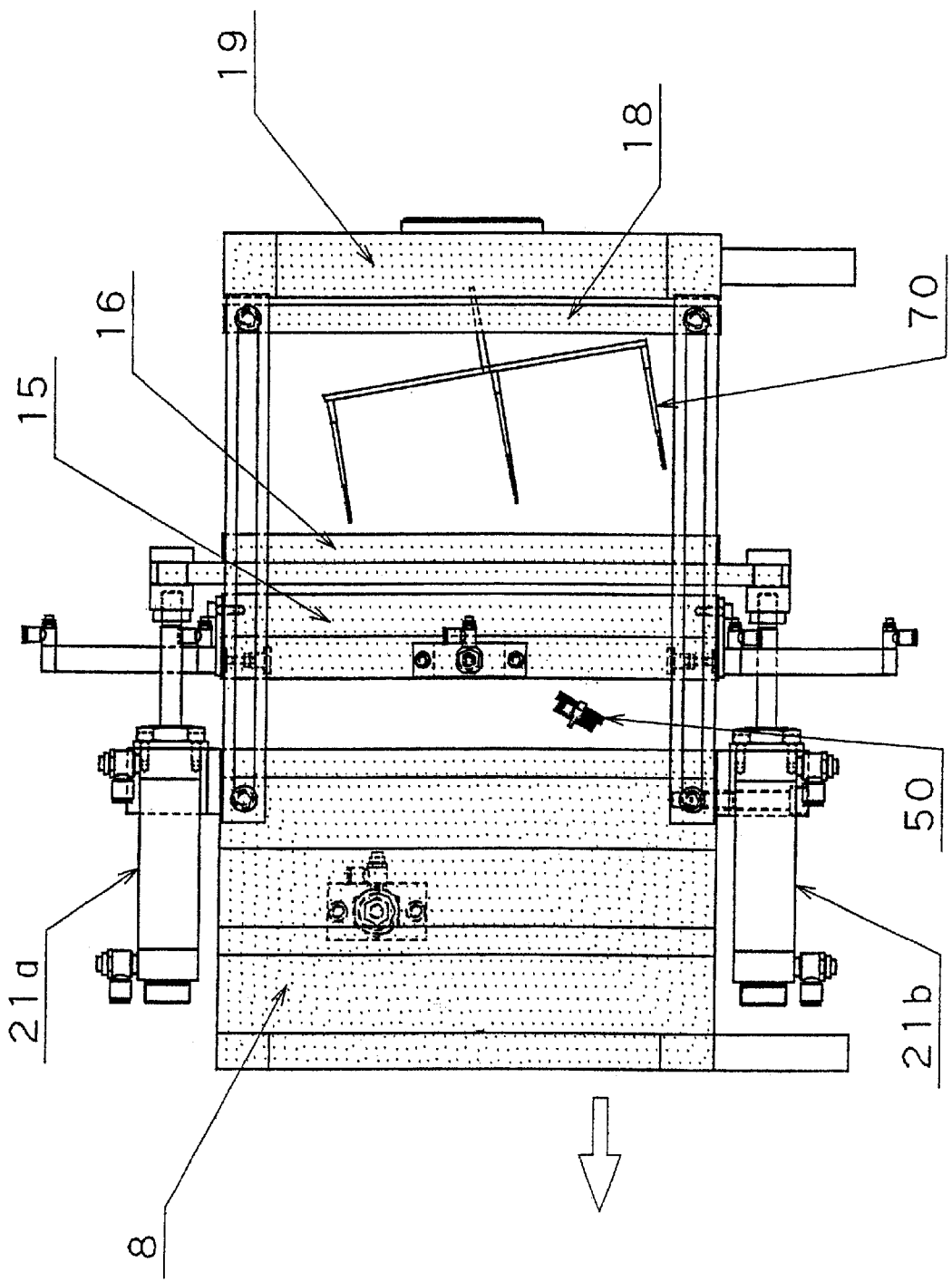
FIG. 12 is a descriptive view showing a second step of the method.

In the second step, as shown in FIG. 12, the mold plate drive cylinders 21a, 21b are operated to move the first to third mold plates 8, 15, 16 in a horizontal direction (a direction indicated with an arrow), so the first to fifth mold plates 8, 15, 16, 18, 19 are disengaged from each other. During this step, the ejector pin (not shown) is extended from the first mold plate 8 in a horizontal direction to eject the resin product 50. Furthermore, the runner 70 is ejected when the fourth mold plate 18 is disengaged from the fifth mold plate 19.

Figure 4:
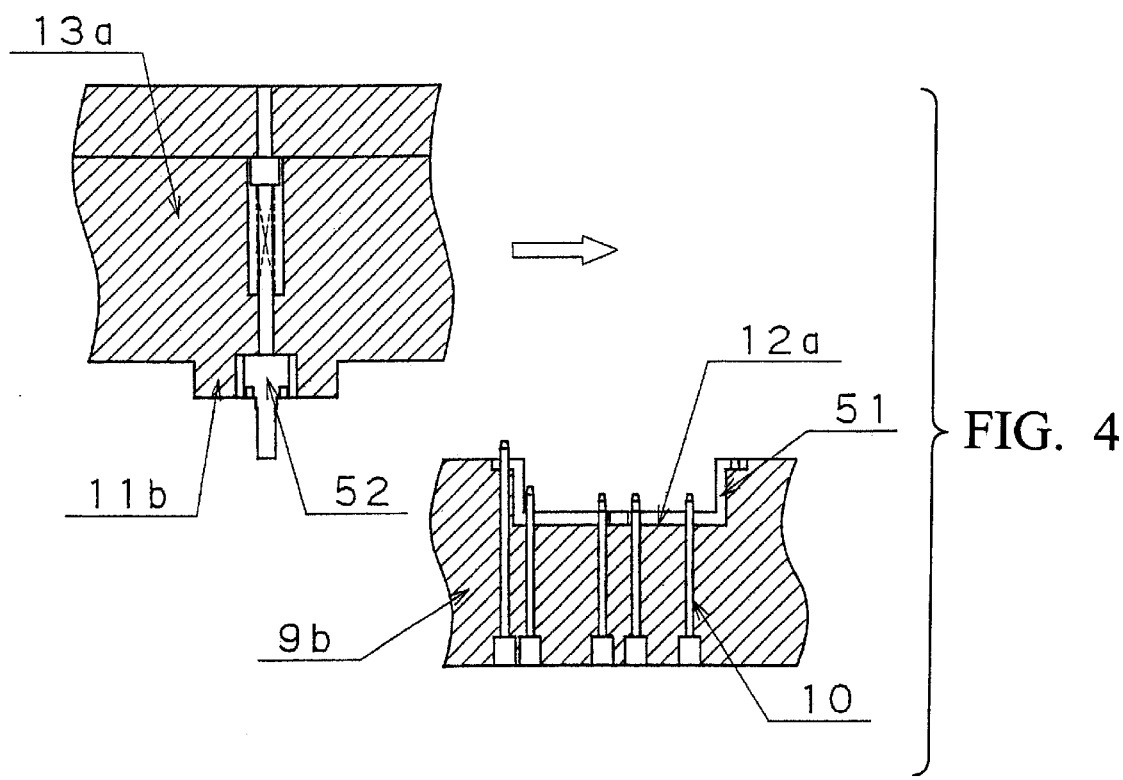
FIG. 4 is a descriptive view showing operation of a transferring device of the apparatus shown in FIG. 1.
Figure 5:
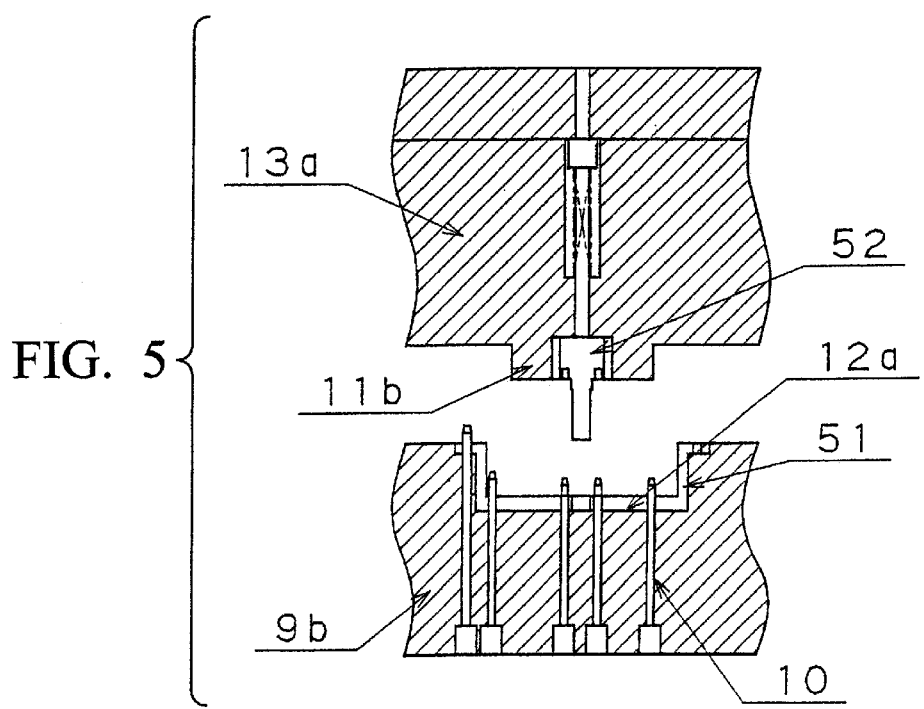
FIG. 5 is another descriptive view showing operation of the transferring device of the apparatus shown in FIG. 1.

In the third step, the parts 51–55 are transferred to predetermined locations of the assembling station by the transferring device 4. More particularly, as shown in FIG. 13, the first to third sliders 13a–13c are moved inwardly (directions indicated with arrows) by operating the first to third slider drive cylinders 14a–14c. As a result, the first and second cores 11a, 11b of the first slider 13a, the third core 11c of the second slider 13b, and the fourth and fifth cores 11d, 11e of the third slider 13c are positioned over the circular plate 6 of the assembling station. Since the parts 51–55, which are molded in the cavities 12, are designed to adhere to the cores 11 due to post-mold shrinkage of the parts 51–55, the parts 51–55 are transferred along with the cores 11, as shown in FIGS. 4 and 5.

Figure 14:
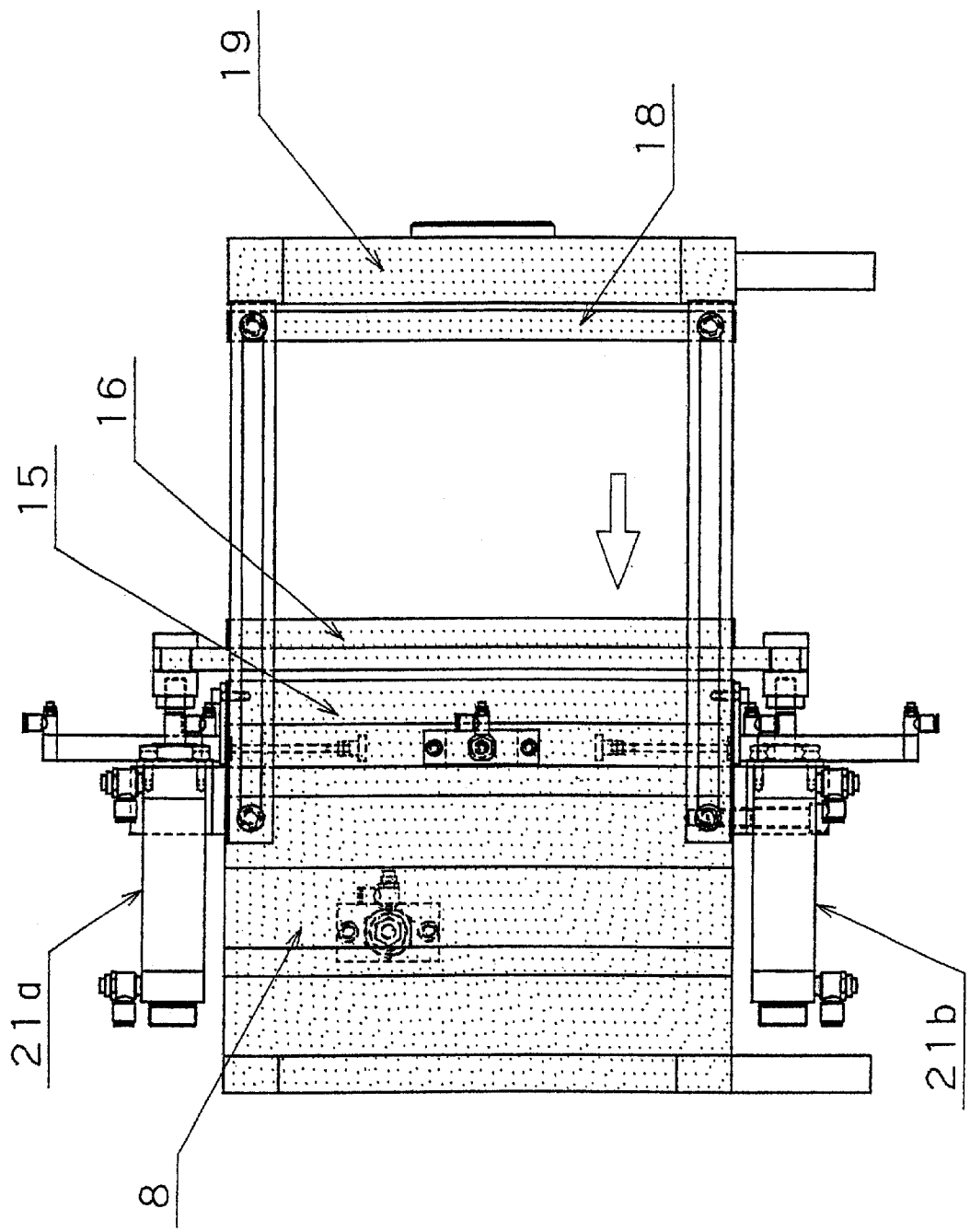
FIG. 14 is a descriptive view showing a fourth step of the method.

In the fourth step, as shown in FIG. 14, the mold plate drive cylinders 21a, 21b are operated to move the second mold plate 15 in a direction indicated with an arrow to engage the second mold plate 15 to the first mold plate 8. During this movement, the sliders 13 of the second mold plate 15 are moved slightly toward the assembling sections 9 of the first mold plate 8 in a direction indicated with the arrow in FIG. 14.

Figure 15:
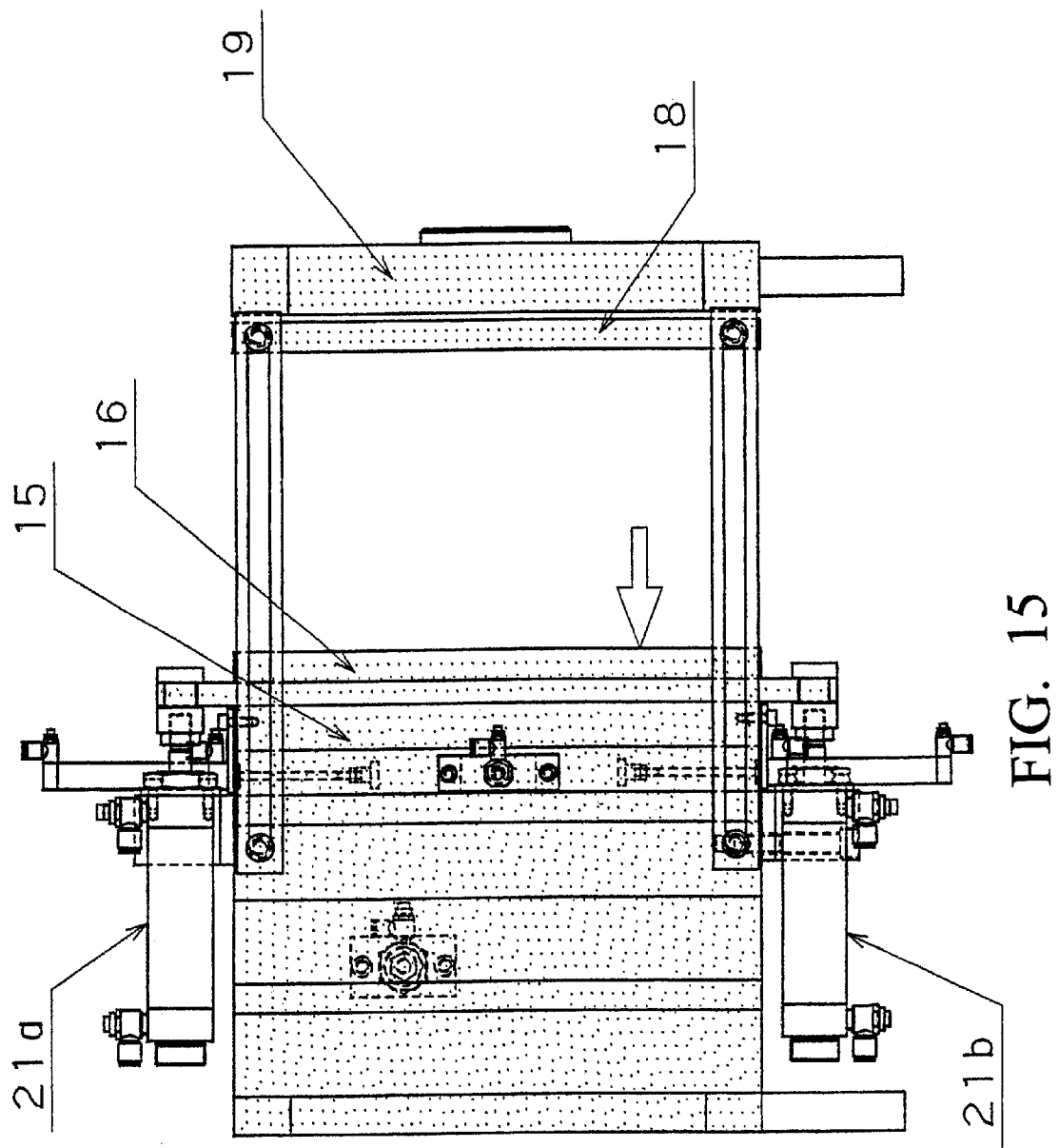
FIG. 15 is a descriptive view showing a fifth step of the method.

In the fifth step, as shown in FIG. 15, the mold plate drive cylinders 21a, 21b are operated to move the third mold plate 16 in a direction indicated with an arrow for engaging the third mold plate 16 to the second mold plate 15, resulting in the displacing device 5 to displace the parts 51–55 to the rotatable member 3 of the assembling station and assemble the parts 51–55 therein.

More particularly, as shown in FIG. 7, the push pins 17 of the third mold plate 16 move through the holes 15a of the second mold plate 15 and urges the knockout pins 23 of the first to third sliders 13a–13c against the parts 51–55, which are held in the cores 11, to displace the parts 51–55 to the assembling sections 9 of the rotatable member 3.

Figure 16:
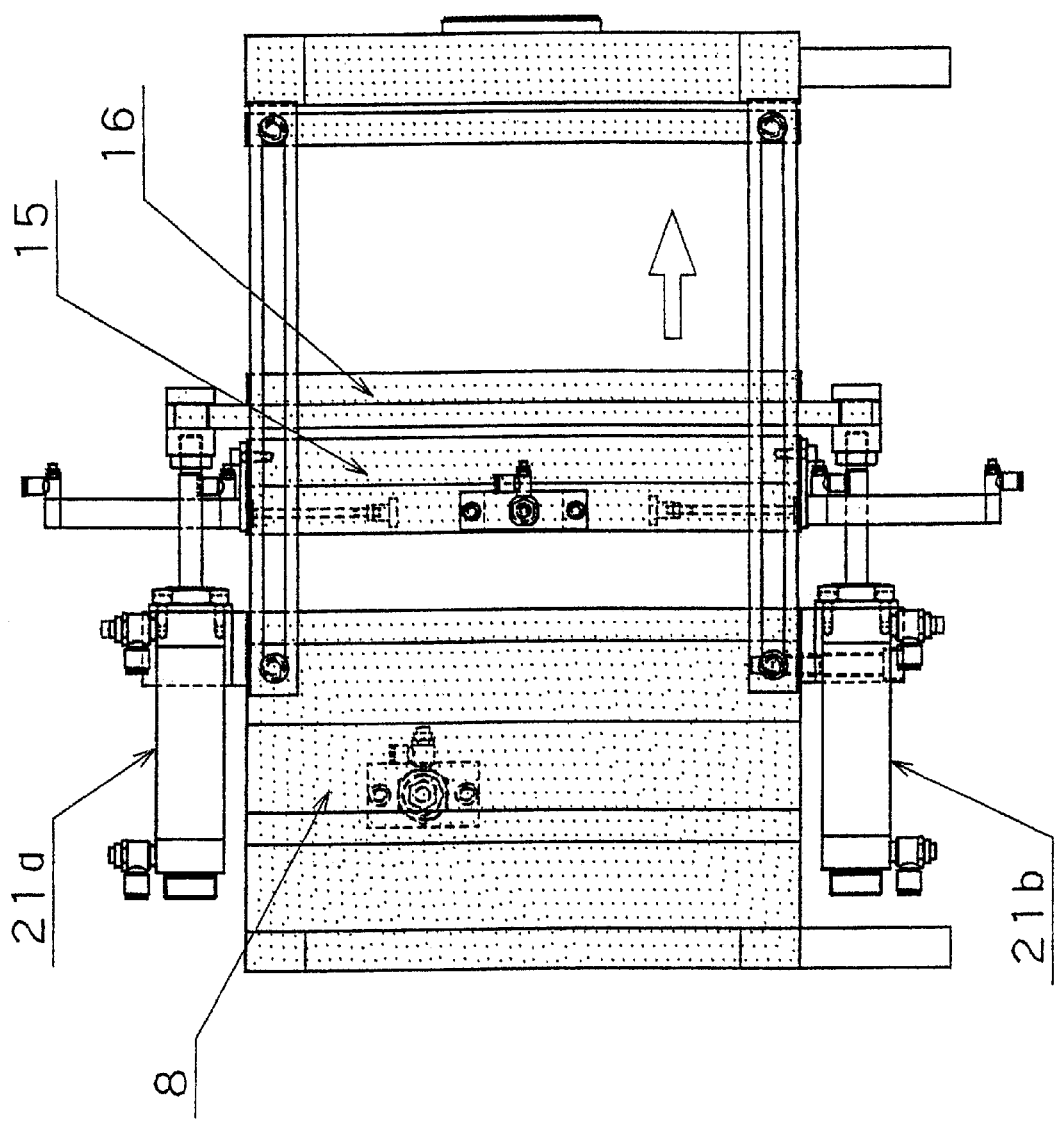
FIG. 16 is a descriptive view showing a sixth step of the method.

In the sixth step, as shown in FIG. 16, the mold plate drive cylinders 21a, 21b are operated to move the second and third mold plates 15, 16 in a direction indicated with an 20 arrow for disengaging the first to third mold plates 8, 15, 16 from each other.

Figure 17:
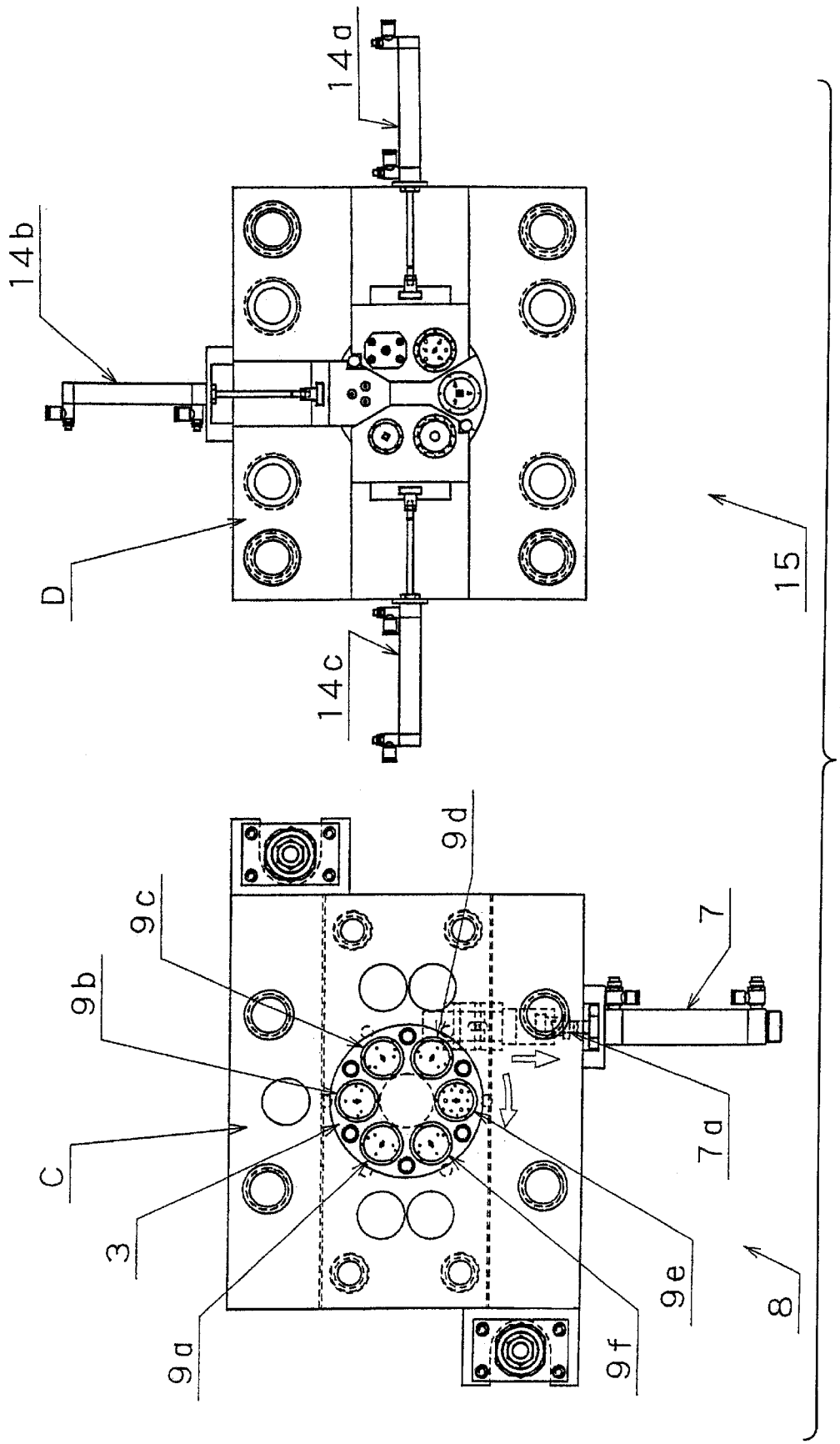
FIG. 17 is a descriptive view showing a seventh step of the method.

In the seventh step, as shown in FIG. 17, the rotatable member drive cylinder 7 is operated to rotate the rotatable member 3 through a predetermined rotational angle. More particularly, the rod 7a of the rotatable member drive cylinder 7 is moved in a direction indicated with an arrow (downward) to rotate the rotatable member 3 in a direction indicated with another arrow (clockwise) through a predetermined rotational angle. During this movement, each assembling section 9 of the rotatable member 3 is moved through a predetermined rotational angle to a next position for fitting the next part.

Figure 18:
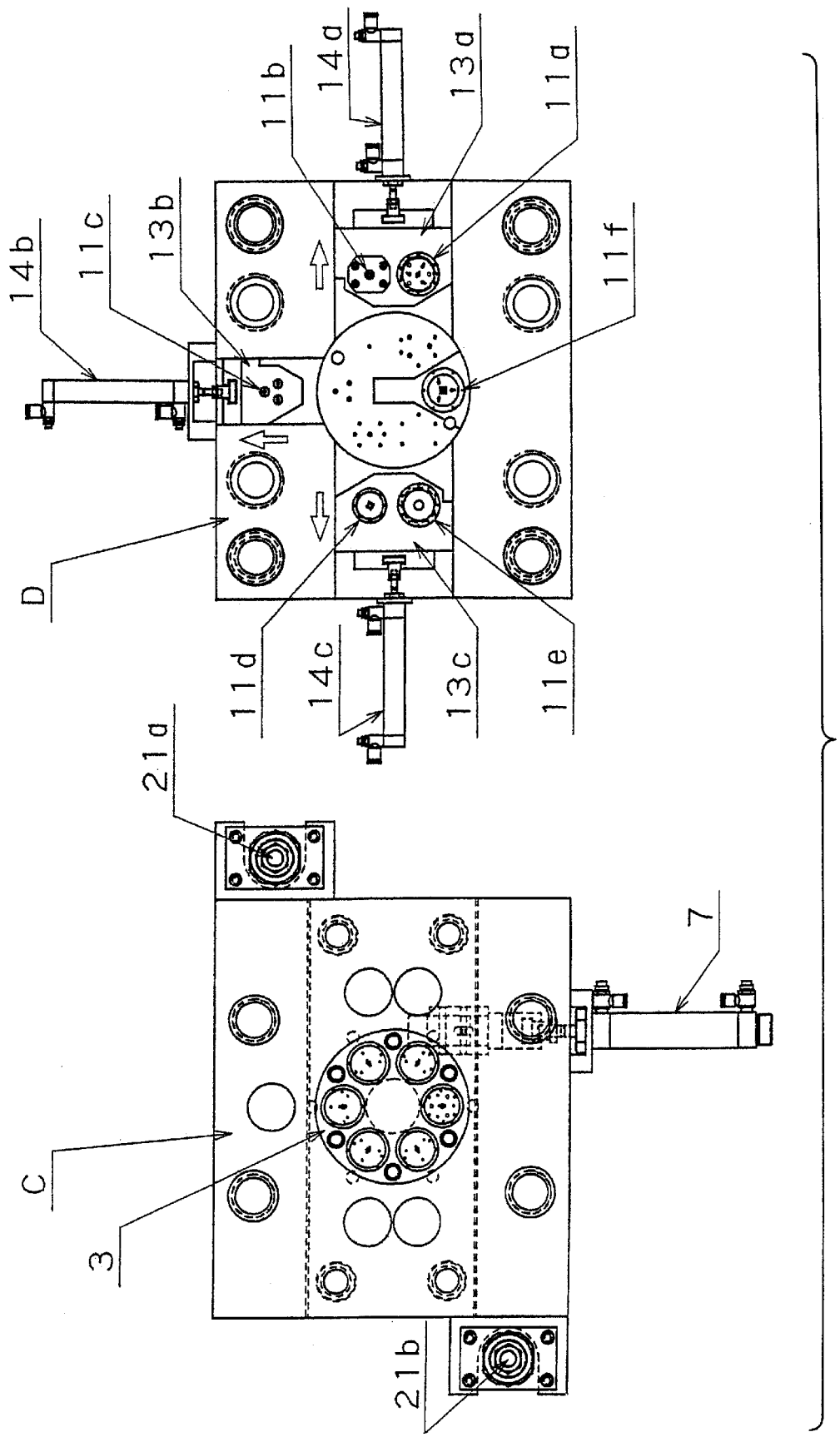
FIG. 18 is a descriptive view showing an eighth step of the method.

In the eighth step, the transferring device 4 is operated to transfer the cores 11 of the sliders 13 to moldable positions, in which the cavities 12 and the cores 11 are opposed with each other. In this embodiment, this step is carried out by returning the sliders 13 of the transferring device 4 to their initial positions. More particularly, as shown in FIG. 18, the first to third slider drive cylinders 14a–14c are operated to move the first to third sliders 13a–13c outwardly (in directions indicated with arrows). With this movement, the first and second cores 11a, 11b of the first slider 13a, the third core 11c of the second slider 13b, and the fourth and fifth cores 11d, 11e of the third slider 13c are returned to their initial positions. Therefore, the first to fifth cores 11a–11e are positioned in opposed relation to the first to fifth cavities 12a–12e, respectively, so that molding can be performed once again.

The method of the present invention provides desired resin products at the resin product finish area 20 at a rate of one resin product per each molding by repeating the steps 1 to 8. With this invention, the resin products that include relatively moveable functional parts, such as gears, can be produced in a manner that assures relative movements of the functional parts in the finished resin product.

The above embodiment can be modified as follows. The displacing device of the present invention is not limited to the above displacing device 5 and can be integrated in the transferring device, so that the transferring device can transfer the resin parts that are held by the corresponding cores to a position adjacent to the corresponding assembling sections and, then, separate the resin parts from the core and places the resin parts to the assembling sections.

The present examples and embodiments are to be considered as illustrative and not restrictive and the invention is not to be limited to the details given herein, but may be modified within the scope and equivalence of the appended claims.

What is claimed is:

1. An apparatus for molding and assembling resin-molded parts, comprising: a first molding unit including
    a receiving member having a receiving location and an assembly location, said receiving member configured to hold a primary part,
    a first primary molding element configured to create said primary part by molding at a primary molding location, and
    a first secondary molding element configured to create a secondary part by molding at a secondary molding location; and
a second molding unit engageable with said first molding unit, said second molding unit including
    a second primary molding element engageable with said first primary molding element to create said primary part by molding at said primary molding location when said first and second molding units engage,
    a second secondary molding element engageable with said first secondary molding element to create said secondary part by molding at said secondary molding location when said first and second molding units engage,
    a primary part-transferring device connected to said second primary molding element to move said second primary molding element reciprocally between said primary molding location and said receiving location,
    a secondary part transferring device connected to said second secondary molding element to move said second secondary molding element reciprocally between said secondary molding location and said assembly location,
    a primary part releasing device configured to release said primary part from said second primary molding element to said receiving member at said receiving location when said first and second molding units engage, and
    a secondary part releasing device configured to release said secondary part from said second secondary molding element to said receiving member and to assemble said secondary part to said primary part at said assembly location when said first and second molding units engage.

2. An apparatus according to claim 1, wherein said first secondary molding element is a cavity, said second secondary molding element is a core, and said core is configured to hold said secondary part having shrunk after molding.

3. An apparatus according to claim 1, further comprising a pair of drive cylinders connected to said first and second molding units to move said first and second molding units.

4. An apparatus according to claim 1, wherein each of said releasing devices includes a knockout pin extendable through said second molding unit.

5. An apparatus according to claim 4, wherein each of said releasing devices further includes a spring to automatically return said knockout pin to an original position.

6. An apparatus according to claim 1, wherein
said receiving member is rotatable;
said primary molding location is located radially outside of said receiving member; and
said secondary molding location is located radially outside of said receiving member.

7. An apparatus according to claim 6, wherein said receiving member is a turntable intermittently rotatable to move said primary part from said receiving location to said assembly location.

8. An apparatus according to claim 6, wherein said receiving member is a turntable, which intermittently rotates by a predetermined rotational angle.

9. An apparatus according to claim 1, wherein said receiving member includes a holding pin extending from said receiving member for restricting disengagement and movement of said primary part.

10. An apparatus for molding and assembling resin-molded parts, comprising: a first molding unit having
    a receiving member having a receiving location and an assembly location, said receiving member configured to hold a primary part,
    a first primary molding element configured to create said primary part by molding at a primary molding location, and
    a first secondary molding element configured to create a secondary part by molding at a secondary molding location; and
a second molding unit engageable with said first molding unit, said second molding unit having
    a molding block having
        a second primary molding element engageable with said first primary molding element to create said primary part by molding at said primary molding location when said first and second molding units engage, and
        a second secondary molding element engageable with said first secondary molding element to create said secondary part by molding at said secondary molding location when said first and second molding units engage,
    a part transferring device connected to said molding block to move said molding block reciprocally between said molding locations and said receiving and assembly locations,
    a primary part releasing device configured to release said primary part from said second primary molding element to said receiving member at said receiving location when said first and second molding units engage, and
    a secondary part releasing device configured to release said secondary part from said second secondary molding element to said receiving member and to assemble said secondary part to said primary part at said assembly location when said first and second molding units engage.

11. An apparatus according to claim 10, wherein said first secondary molding element is a cavity, said second secondary molding element is a core, and said core is configured to hold said secondary part having shrunk after molding.

12. An apparatus according to claim 10, further comprising a pair of drive cylinders connected to said first and second molding units to move said first and second molding units.

13. An apparatus according to claim 10, wherein each of said releasing devices includes a knockout pin extendable through said second molding unit.

14. An apparatus according to claim 13, wherein each of said releasing devices further includes a spring to automatically return said knockout pin to an original position.

15. An apparatus according to claim 10, wherein said receiving member is rotatable;

said primary molding location is located radially outside of said receiving member; and said secondary molding location is located radially outside of said receiving member.

16. An apparatus according to claim 15, wherein said receiving member is a turntable intermittently rotatable to move said primary part from said receiving location to said assembly location.

17. An apparatus according to claim 10, wherein said receiving member includes a holding pin extending from said receiving member for restricting disengagement and movement of said primary part.

18. An apparatus for molding and assembling resin-molded parts, comprising: a first molding unit including a receiving member having a receiving location, a first assembly location, and a second assembly location, said receiving member configured to hold a plurality of primary parts, a first primary molding element configured to create a primary part by molding at a primary molding location, a first secondary molding element configured to create a secondary part by molding at a secondary molding location, and a first tertiary molding element configured to create a tertiary part by molding at a tertiary molding location; and a second molding unit engageable with said first molding unit, said second molding unit including a second primary molding element engageable with said first primary molding element to create said primary part by molding at said primary molding location when said first and second molding units engage, a second secondary molding element engageable with said first secondary molding element to create said secondary part by molding at said secondary molding location when said first and second molding units engage, a second tertiary molding element engageable with said first tertiary molding element to create said tertiary part by molding at said tertiary molding location when said first and second molding units engage, a primary part handling device configured to release said primary part from said primary molding elements to said receiving member at said receiving location when said first and second molding units engage, a secondary part handling device configured to release said secondary part from said secondary molding elements to said receiving member and to assemble said secondary part to said primary part at said first assembly location when said first and second molding units engage, and a tertiary part handling device configured to release said tertiary part from said tertiary molding elements to said receiving member and to assemble said tertiary part to said primary part assembled with said second part at said second assembly location when said first and second molding units engage.

19. An apparatus according to claim 18, wherein said receiving member is rotatable;

said primary molding location is located radially outside of said receiving member;

said secondary molding location is located radially outside of said receiving member; and said tertiary molding location is located radially outside of said receiving member.

20. An apparatus according to claim 19, wherein said receiving member is a turntable intermittently rotatable to move said primary part from said receiving location to said first assembly location and to said second assembly location.

* * * * *